(12) United States Patent
Hirata et al.

(10) Patent No.: US 9,765,193 B2
(45) Date of Patent: Sep. 19, 2017

(54) THREE-DIMENSION FORMATION COMPOSITION, METHOD OF MANUFACTURING THREE-DIMENSIONAL STRUCTURE, AND THREE-DIMENSIONAL STRUCTURE

(71) Applicant: SEIKO EPSON CORPORATION, Tokyo (JP)

(72) Inventors: Koki Hirata, Nagano (JP); Hiroshi Fukumoto, Nagano (JP); Shinichi Kato, Nagano (JP); Chigusa Sato, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/112,050

(22) PCT Filed: Jun. 30, 2015

(86) PCT No.: PCT/JP2015/003290
§ 371 (c)(1),
(2) Date: Jul. 15, 2016

(87) PCT Pub. No.: WO2016/009602
PCT Pub. Date: Jan. 21, 2016

(65) Prior Publication Data
US 2016/0333153 A1    Nov. 17, 2016

(30) Foreign Application Priority Data

Jul. 1, 2014 (JP) .................................. 2014-136177
Apr. 10, 2015 (JP) .................................. 2015-080919

(51) Int. Cl.
*B29C 67/00* (2017.01)
*B33Y 10/00* (2015.01)
(Continued)

(52) U.S. Cl.
CPC ............. *C08J 5/00* (2013.01); *B29C 67/0081* (2013.01); *B29C 67/0085* (2013.01);
(Continued)

(58) Field of Classification Search
None
See application file for complete search history.

(56) References Cited

U.S. PATENT DOCUMENTS 3,732,107 A    5/1973  Faust
3,857,885 A    12/1974 Faust
(Continued)

FOREIGN PATENT DOCUMENTS

JP    46-027926 A    8/1971
JP    48-041708 A    12/1973
(Continued)

*Primary Examiner* — Mary F Theisen
(74) *Attorney, Agent, or Firm* — Global IP Counselors, LLP

(57) ABSTRACT

There are provided a method of manufacturing a three-dimensional structure, and three-dimension formation composition, by each which a three-dimensional structure can be manufactured with high dimensional accuracy, and provided a three-dimensional structure manufactured with high dimensional accuracy.

There is provided a method of manufacturing a three-dimensional structure, in which the three-dimensional structure is manufactured by laminating a layer, the method including: forming the layer using a three-dimension formation composition containing particles, a binding resin, and a water-based solvent; removing the water-based solvent from the layer by heating the layer; and applying a binding solution containing a binder to the layer, in which the binding resin has an ammonium salt of a carboxyl group as a functional group.

14 Claims, 4 Drawing Sheets

(51) Int. Cl.
*B33Y 70/00* (2015.01)
*C08J 5/00* (2006.01)
*B33Y 80/00* (2015.01)
*B33Y 40/00* (2015.01)
*C08J 3/00* (2006.01)
*C08J 3/20* (2006.01)
*B29K 105/16* (2006.01)
*C08K 3/36* (2006.01)
*C08K 7/26* (2006.01)

(52) U.S. Cl.
CPC ...... *B29C 67/0092* (2013.01); *B29C 67/0096* (2013.01); *B33Y 10/00* (2014.12); *B33Y 40/00* (2014.12); *B33Y 70/00* (2014.12); *B33Y 80/00* (2014.12); *C08J 3/005* (2013.01); *C08J 3/203* (2013.01); *B29K 2105/16* (2013.01); *C08J 2301/26* (2013.01); *C08J 2305/04* (2013.01); *C08J 2307/00* (2013.01); *C08J 2309/00* (2013.01); *C08J 2325/08* (2013.01); *C08J 2333/02* (2013.01); *C08J 2429/04* (2013.01); *C08J 2433/26* (2013.01); *C08K 3/36* (2013.01); *C08K 7/26* (2013.01)

(56) References Cited

U.S. PATENT DOCUMENTS

| | | | |
|---|---|---|---|
| 4,458,006 A | 7/1984 | Doenges et al. | |
| 4,495,271 A | 1/1985 | Geissler et al. | |
| 4,530,747 A | 7/1985 | Donges et al. | |
| 4,987,053 A | 1/1991 | Gersdorf et al. | |
| 5,200,299 A | 4/1993 | Steppan et al. | |
| 5,697,043 A * | 12/1997 | Baskaran | B22F 1/0059 264/308 |
| 6,007,318 A | 12/1999 | Russell et al. | |
| 6,375,874 B1 | 4/2002 | Russell et al. | |
| 6,596,224 B1 | 7/2003 | Sachs et al. | |
| 6,989,115 B2 | 1/2006 | Russell et al. | |
| 7,569,273 B2 | 8/2009 | Bredt et al. | |
| 8,425,816 B2 * | 4/2013 | Okamoto | C08L 83/04 264/109 |
| 2010/0247938 A1 | 9/2010 | Abe et al. | |
| 2010/0323301 A1 | 12/2010 | Tang | |
| 2015/0231798 A1* | 8/2015 | Goto | B29C 67/0074 428/206 |
| 2016/0333165 A1* | 11/2016 | Bayer | B29C 67/0096 |

FOREIGN PATENT DOCUMENTS

| | | |
|---|---|---|
| JP | 51-047334 B | 12/1976 |
| JP | 54-021726 B | 8/1979 |
| JP | 57-196231 A | 12/1982 |
| JP | 59-005240 A | 1/1984 |
| JP | 59-005241 A | 1/1984 |
| JP | 01-165613 A | 6/1989 |
| JP | 02-226149 A | 9/1990 |
| JP | 2002-507940 A | 3/2002 |
| JP | 2004-538191 A | 12/2004 |
| JP | 2010-228103 A | 10/2010 |
| JP | 2011-245712 A | 12/2011 |
| WO | 97/44291 A1 | 11/1997 |
| WO | 2004/087823 A1 | 10/2004 |
| WO | 2004/113042 A1 | 12/2004 |

* cited by examiner

THREE-DIMENSION FORMATION COMPOSITION, METHOD OF MANUFACTURING THREE-DIMENSIONAL STRUCTURE, AND THREE-DIMENSIONAL STRUCTURE

TECHNICAL FIELD

The present invention relates to a three-dimension formation composition, a method of manufacturing a three-dimensional structure, and a three-dimensional structure.

BACKGROUND ART

A technology of forming a three-dimensional object while hardening powder with a binding solution is known (for example, refer to PTL 1). In this technology, a three-dimensional object is formed by repeating the following operations. First, a slurry containing powder particles, a water-based solvent and a water-soluble polymer is thinly spread in a uniform thickness to form a layer, and a binding solution is discharged onto a desired portion of the layer to bind the powder particles together. As a result, in the layer, only the portion onto which the binding solution is discharged is attached to form a thin plate-like member (hereinafter referred to as "section member"). Thereafter, a layer is further formed on this layer, and a binding solution is discharged to a desired portion thereof. As a result, a new section member is formed even on the portion of the newly-formed layer to which the binding solution is discharged. In this case, since the binding solution discharged on the powder layer penetrates this layer to reach the previously-formed section member, the newly-formed section member is attached to the previously-formed section member. The thin plate-like section members are laminated one by one by repeating these operations, thereby forming a three-dimensional object.

In this technology of forming a three-dimensional object, when three-dimensional shape data of an object to be formed exists, it is possible to directly form a three-dimensional object by binding powder particles, and there is no need to create a mold prior to formation, so that it is possible to quickly and inexpensively form a three-dimensional object. In addition, since the three-dimensional object is formed by laminating the thin plate-like section members one by one, for example, even in the case of a complex object having a complicated internal structure, it is possible to form the three-dimensional object as an integrally-formed structure without dividing the complex object into a plurality of parts.

However, in the related art, there is problem in that, when a layer (upper layer) is laminated on the formed layer (lower layer) by supplying a forming slurry, a water-soluble polymer binding the particles in the lower layer is melted by a water-based solvent contained in the forming slurry, and thus the shape of the lower layer is changed. Therefore, it is not possible to manufacture a three-dimensional structure with sufficient dimensional accuracy.

CITATION LIST

Patent Literature

[PTL 1]
JP-A-2011-245712

SUMMARY OF INVENTION

Technical Problem

Accordingly, it is an object of the present invention to provide a method of manufacturing a three-dimensional structure, and three-dimension formation composition, by each which a three-dimensional structure can be manufactured with high dimensional accuracy, and to provide a three-dimensional structure manufactured with high dimensional accuracy.

Solution to Problem

The above object is achieved by the following aspects.

According to an aspect of the invention, there is provided a three-dimension formation composition, including: particles; a binding resin; and a water-based solvent, in which the binding resin has an ammonium salt of a carboxyl group as a functional group.

In this case, it is possible to provide a three-dimension formation composition, by which a three-dimensional structure can be manufactured with high dimensional accuracy.

In the three-dimension formation composition of the invention, the binding resin preferably contains one or two or more selected from the group consisting of a reaction product of an olefin-maleic anhydride copolymer with ammonia, a polyacrylic acid ammonium salt, an ammonium salt of carboxymethyl cellulose, a polystyrene carboxylic acid ammonium salt, an ammonium salt of an acrylamide-acrylic acid copolymer, and an alginic acid ammonium salt.

In this case, it is possible to make the productivity of a three-dimensional structure particularly excellent.

In the three-dimension formation composition of the invention, the weight average molecular weight of the binding resin is preferably 50000 to 200000.

In this case, it is possible to further improve the dimensional accuracy of a three-dimensional structure, and it is possible to make the productivity of a three-dimensional structure particularly excellent.

In the three-dimension formation composition of the invention, the binding resin preferably has a structure of acid anhydride which is formed by heating.

In this case, it is possible to make the dimensional accuracy of a three-dimensional structure particularly excellent. Further, it is possible to make the water resistance and durability of a three-dimensional structure particularly excellent. Moreover, it is possible to make the productivity of a three-dimensional structure particularly excellent.

In the three-dimension formation composition of the invention, the binding resin preferably has a cyclic chemical structure which is formed by heating.

In this case, it is possible to make the dimensional accuracy of a three-dimensional structure more excellent. Further, it is possible to make the water resistance and durability of a three-dimensional structure more excellent. Moreover, it is possible to make the productivity of a three-dimensional structure more excellent.

In the three-dimension formation composition of the invention, the binding resin preferably has a five-membered or six-membered cyclic structure which is formed by heating.

In this case, it is possible to make the dimensional accuracy of a three-dimensional structure more excellent. Further, it is possible to make the water resistance and durability of a three-dimensional structure more excellent.

Moreover, it is possible to make the productivity of a three-dimensional structure more excellent.

In the three-dimension formation composition of the invention, the binding resin preferably has an amide group ($-CONH_2$) together with the ammonium salt of a carboxyl group in a molecule.

In this case, it is possible to make the dimensional accuracy of a three-dimensional structure more excellent. Further, it is possible to make the water resistance and durability of a three-dimensional structure more excellent. Moreover, it is possible to make the productivity of a three-dimensional structure more excellent.

The three-dimension formation composition of the invention preferably further includes a compound having an amide group ($-CONH_2$) in addition to the binding resin.

In this case, it can contribute to the stable manufacturing of a three-dimensional structure or the reduction in production cost of a three-dimensional structure. Further, it is possible to further improve the characteristics of a three-dimensional structure and the productivity of a three-dimensional structure.

In the three-dimension formation composition of the invention, the compound having an amide group is preferably polyacrylamide.

In this case, it can contribute to the stable manufacturing of a three-dimensional structure or the reduction in production cost of a three-dimensional structure. Further, it is possible to further improve the characteristics of a three-dimensional structure and the productivity of a three-dimensional structure.

According to another aspect of the invention, there is provided a method of manufacturing a three-dimensional structure, in which the three-dimensional structure is manufactured by laminating a layer, the method including: forming the layer using a three-dimension formation composition containing particles, a binding resin, and a water-based solvent; removing the water-based solvent from the layer by heating the layer; and applying a binding solution containing a binder to the layer, in which the binding resin has an ammonium salt of a carboxyl group as a functional group.

In this case, it is possible to provide a method of manufacturing a three-dimensional structure, by which a three-dimensional structure can be manufactured with high dimensional accuracy.

In the method of manufacturing a three-dimensional structure of the invention, in the removing of the water-based solvent, the layer is preferably heated to a temperature equal to or higher than the glass transition temperature of the binding resin.

In this case, it is possible to more reliably remove a water-based solvent and ammonia, and it is possible to more strongly bind particles together.

In the method of manufacturing a three-dimensional structure of the invention, in the removing of the water-based solvent, the heating temperature is preferably 30 degrees Celsius to 140 degrees Celsius.

In this case, it is possible to more reliably remove a water-based solvent and ammonia. Particularly, since a chemical reaction of dissociating ammonia can be more efficiently processed to make the ratio of an ammonium salt of a carboxyl group contained in a binding resin after the completion of the removing of the water-based solvent lower, the productivity of a three-dimensional structure can be made particularly excellent, and a three-dimensional structure can be manufactured with higher dimensional accuracy.

The method of manufacturing a three-dimensional structure of the invention preferably further includes removing the particles, which are not bound by the binder, after repeating the forming of the layer, the removing of the water-based solvent, and the applying of the binding solution, in which the pH of a removing solution used in the removing of the unbound particles is 9 or more.

In this case, it is possible to more easily remove the particles which are not bound by a binder.

The method of manufacturing a three-dimensional structure of the invention preferably further includes removing the particles, which are not bound by the binder, after repeating the forming of the layer, the removing of the water-based solvent, and the applying of the binding solution, in which, in the removing of the unbound particles, ammonia is used.

In this case, it is possible to make the productivity of a three-dimensional structure particularly excellent, and it is possible to make the dimensional accuracy of a three-dimensional structure particularly excellent.

According to still another aspect of the invention, there is provided a three-dimensional structure, which is manufactured by the method of manufacturing a three-dimensional structure of the invention.

In this case, it is possible to provide a three-dimensional structure manufactured with high dimensional accuracy.

DESCRIPTION OF EMBODIMENTS

Hereinafter, preferred embodiments of the invention will be described in detail with reference to the accompanying drawings.

(1. Method of Manufacturing Three-Dimensional Structure)

First, a method of manufacturing a three-dimensional structure according to the invention will be described.

FIGS. 1A to 2D are schematic views showing each process of a preferred embodiment in the method of manufacturing a three-dimensional structure of the invention. FIG. 3 is a flowchart showing an example of the method of manufacturing a three-dimensional structure of the invention.

As shown in FIGS. 1A to 2D, the method of manufacturing a three-dimensional structure according to the present embodiment includes: layer forming processes (FIGS. 1A and 1D) of forming layers 1 using a three-dimension formation composition containing particles, a binding resin, and a water-based solvent; drying processes of heating and drying the layer 1 (FIGS. 1A and 1D); a binding solution application processes (FIGS. 1B and 2A) of applying a binding solution 2 containing a binder to each of the layers 1 by an ink jet method; and curing processes (FIGS. 1C and 2B) of curing the binder contained in the binding solution 2 applied to each of the layers 1. Here, these processes are sequentially repeated (FIG. 2C). The method of manufacturing a three-dimensional structure further includes an unbound particle removal process (FIG. 2D) of removing particles, which are not bound by the binder, from the particles constituting each of the layers 1.

[Layer Forming Process]

Figure 1A:
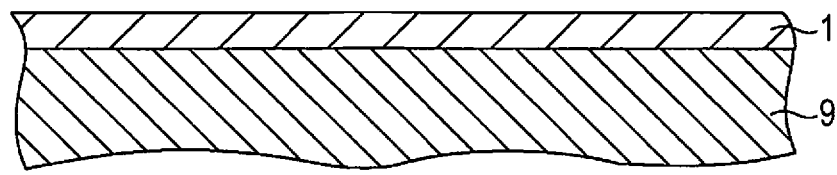
FIG. 1A is a schematic view showing each process of a preferred embodiment in a method of manufacturing a three-dimensional structure of the invention.

First, a layer 1 is formed on a support (stage) 9 using a three-dimension formation composition containing particles, a binding resin, and a water-based solvent (FIG. 1A).

The support 9 has a flat surface (site on which the three-dimension formation composition is applied). Thus, it is possible to easily and reliably form the layer 1 having high thickness uniformity.

It is preferable that the support 9 is made of a high-strength material. Various kinds of metal materials, such as stainless steel and the like, are exemplified as the constituent material of the support 9.

In addition, the surface (site on which the three-dimension formation composition is applied) of the support 9 may be surface-treated. Thus, it is possible to effectively prevent the constituent material of the three-dimension formation composition or the constituent material of the binding solution 2 from adhering to the support 9, and it is also possible to realize the stable production of a three-dimensional structure 100 over a long period of time by making the durability of the support 9 particularly excellent. As the material used in the surface treatment of the support 9, a fluorine-based resin, such as polytetrafluoroethylene, is exemplified.

The three-dimension formation composition contains particles, a binding resin, and a water-based solvent.

By allowing the three-dimension formation composition to contain the binding resin, the particles are bound (temporarily fixed) together to effectively prevent the involuntary scattering of the particles. Thus, it is possible to improve the safety of workers or the dimensional accuracy of the three-dimensional structure 100 which is manufactured.

Particularly, the invention is characterized in that the binding resin has an ammonium salt of a carboxyl group as a functional group.

In the three-dimension formation composition used in the formation of the layer 1, the binding resin (R—(COONH$_4$)$_m$) having an ammonium salt of a carboxyl group as a functional group is dissociated into R—(COO$^-$)$_m$+ mNH$_4^+$, and dissolved in a water-based solvent. When this resultant is heated and dried in a drying process to be described later, the water-based solvent is volatilized, and simultaneously ammonia is dissociated from the binding resin and volatilized. Therefore, the binding resin has a chemical structure of, for example, R—(COOH)$_m$ to be insoluble in the water-based solvent (neutral liquid).

Therefore, in the case of forming second layer 1 and subsequent layers 1 using a three-dimension formation composition, when a three-dimension formation composition used in the formation of a new layer 1 is applied, it is possible to prevent the binding resin bonding between the particles of the layer 1 disposed under the new layer 1 from being eluted by the water-based solvent contained in the three-dimension formation composition. Thus, it is possible to effectively prevent the involuntary deformation of the layer 1 in the manufacturing of the three-dimensional structure 100, and, as a result, it is possible to manufacture the three-dimensional structure 100 with high dimensional accuracy.

Further, in the invention, the water-based solvent refers to water or a liquid having high affinity to water. Specifically, the water-based solvent refers to a solvent having a solubility of 50 g or more in 100 g of water at 25 degrees Celsius.

This process can be performed using a squeegee method, a screen printing method, a doctor blade method, a spin coating method, or the like.

The thickness of the layer 1 formed in this process is not particularly limited, but is preferably 10 micrometers to 100 micrometers, and more preferably 10 micrometers to 50 micrometers. Thus, the productivity of the three-dimensional structure 100 can be sufficiently increased, the occurrence of involuntary unevenness in the manufactured three-dimensional structure 100 can be more effectively prevented, and the dimensional accuracy of the three-dimensional structure 100 can be particularly increased.

[Drying Process]

In this process, the layer 1 formed using the three-dimension formation composition is heated and dried to remove the water-based solvent from the layer 1. In this process, the water-based solvent is removed from the layer 1, and simultaneously ammonia is dissociated from the binding resin constituting the layer 1 and is removed from the layer 1. Thus, the layer 1 is changed from a high hydrophilic state to a high hydrophobic state (that is, a low hydrophilic state), and has low affinity to the water-based solvent. As a result, for example, when second layer 1 and subsequent layers 1 are formed using the three-dimension formation composition, it is possible to effectively prevent the layer 1 disposed under a new layer 1, that is, the layer 1 subjected to the drying process from being deformed due to the water-based solvent contained in the three-dimension formation composition used in the formation of the new layer 1.

It is preferable that the heating temperature in this drying process is equal to or higher than the glass transition temperature of the binding resin. Thus, in the dying process, it is possible to reliably remove the water-based solvent and ammonia, and it is possible to temporarily fix the particles to each other more reliably.

Specifically, the heating temperature in the drying process is preferably 30 degrees Celsius to 140 degrees Celsius, and more preferably 40 degrees Celsius to 120 degrees Celsius. In this case, it is possible to more reliably remove the water-based solvent and ammonia. Particularly, in this case, a chemical reaction of converting an ammonium salt of a carboxyl group into a carboxyl group (not salt) or a chemical reaction of forming the structure of acid anhydride from an ammonium salt of a carboxyl group and amide group is more efficiently processed, ammonia can be more efficiently dissociated, and thus the ratio of the ammonium salt of a carboxyl group contained in the binding resin after the completion of this drying process can be further lowered. As a result, the productivity of the three-dimensional structure 100 can be made particularly excellent, the involuntary deformation of the layer 1 in the manufacture of the three-dimensional structure 100 can be more effectively prevented, and thus the three-dimensional structure 100 can be manufactured with higher dimensional accuracy.

[Binding Solution Application Process]

Figure 1B:
FIG. 1B is a schematic view showing each process of a preferred embodiment in a method of manufacturing a three-dimensional structure of the invention.
Figure 1B:
Figure 1B:
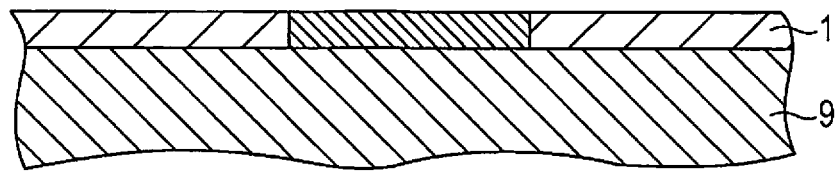

Thereafter, a binding solution 2 containing a binder is applied to the layer 1 by an ink jet method (FIG. 1B).

In this process, the binding solution 2 is selectively applied to only the site corresponding to the real part (substantial site) of the three-dimensional structure 100 in the layer 1.

In this process, since the binding solution 2 is applied by an ink jet method, the binding solution 2 can be applied with good reproducibility even when the pattern of the applied binding solution 2 has a fine shape. As a result, it is possible to make the dimensional accuracy of the finally obtained three-dimensional structure 100 particularly high.

Further, as described above, since the binding resin constituting the layer 1 has high hydrophobicity in the drying process, when the binding solution 2 applied in this process is a binding solution having high hydrophobicity, which will be described later, the affinity between the layer 1 and the binding solution 2 can be made excellent. As a result, the repelling of the binding solution 2 on the layer 1 can be effectively prevented, and thus the binding solution 2 can suitably penetrate into the layer 1. Therefore, it is possible to more reliably make the dimensional accuracy and mechanical strength of the finally-obtained three-dimensional structure 100 particularly excellent.

The binding solution 2 will be described in detail later.

[Curing Process]

Figure 1C:
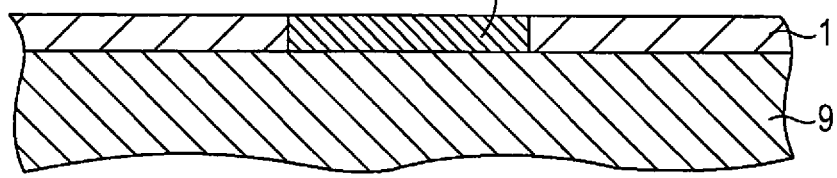
FIG. 1C is a schematic view showing each process of a preferred embodiment in a method of manufacturing a three-dimensional structure of the invention.

Next, the binding solution applied to the layer 1 is cured to form a cured portion 3 (FIG. 1C). Thus, binding strength between the particles can be made particularly excellent, and, as a result, the mechanical strength or water resistance of the finally obtained three-dimensional structure 100 can be made particularly excellent.

Although differing depending on the kind of a curing component (binder), for example, when the curing component (binder) is a thermosetting component, this process can be performed by heating, and, when the curing component (binder) is photocurable component, this process can be performed by irradiation of the corresponding light (for example, this process can be performed by irradiation of ultraviolet rays when the curing component is an ultraviolet-curable component).

The binding solution application process and the curing process may be simultaneously performed. That is, the curing reaction may sequentially proceed from the site on which the binding solution 2 is applied, before the entire pattern of one entire layer 1 is formed.

Figure 1D:
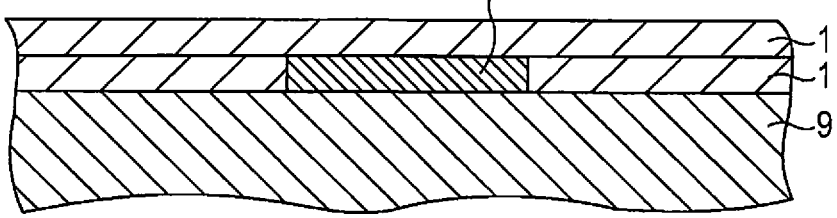
FIG. 1D is a schematic view showing each process of a preferred embodiment in a method of manufacturing a three-dimensional structure of the invention.
Figure 2A:
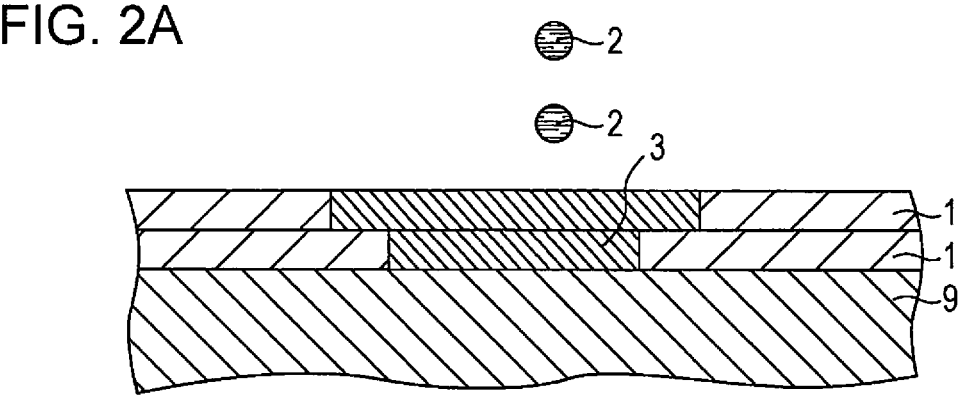
FIG. 2A is a schematic view showing each process of a preferred embodiment in a method of manufacturing a three-dimensional structure of the invention.
Figure 2B:
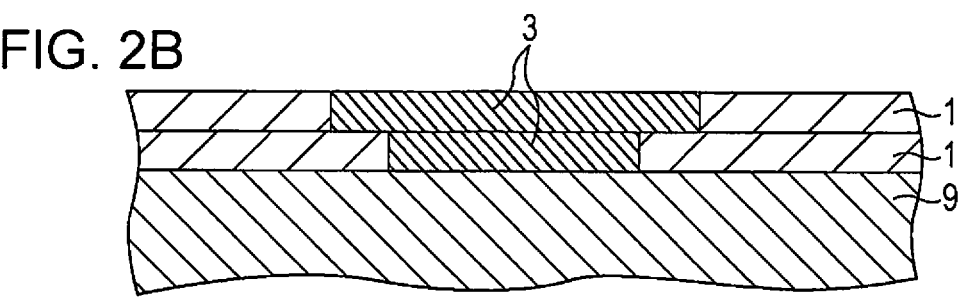
FIG. 2B is a schematic view showing each process of a preferred embodiment in a method of manufacturing a three-dimensional structure of the invention.
Figure 2C:
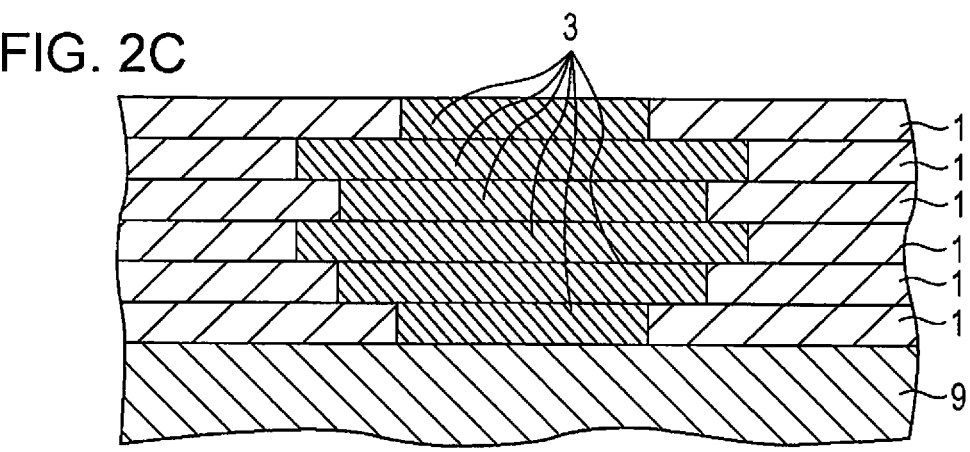
FIG. 2C is a schematic view showing each process of a preferred embodiment in a method of manufacturing a three-dimensional structure of the invention.
Figure 2D:
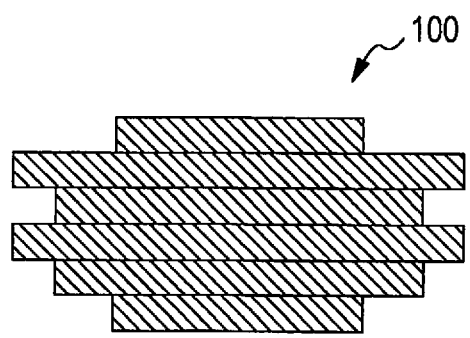
FIG. 2D is a schematic view showing each process of a preferred embodiment in a method of manufacturing a three-dimensional structure of the invention.
Figure 3:
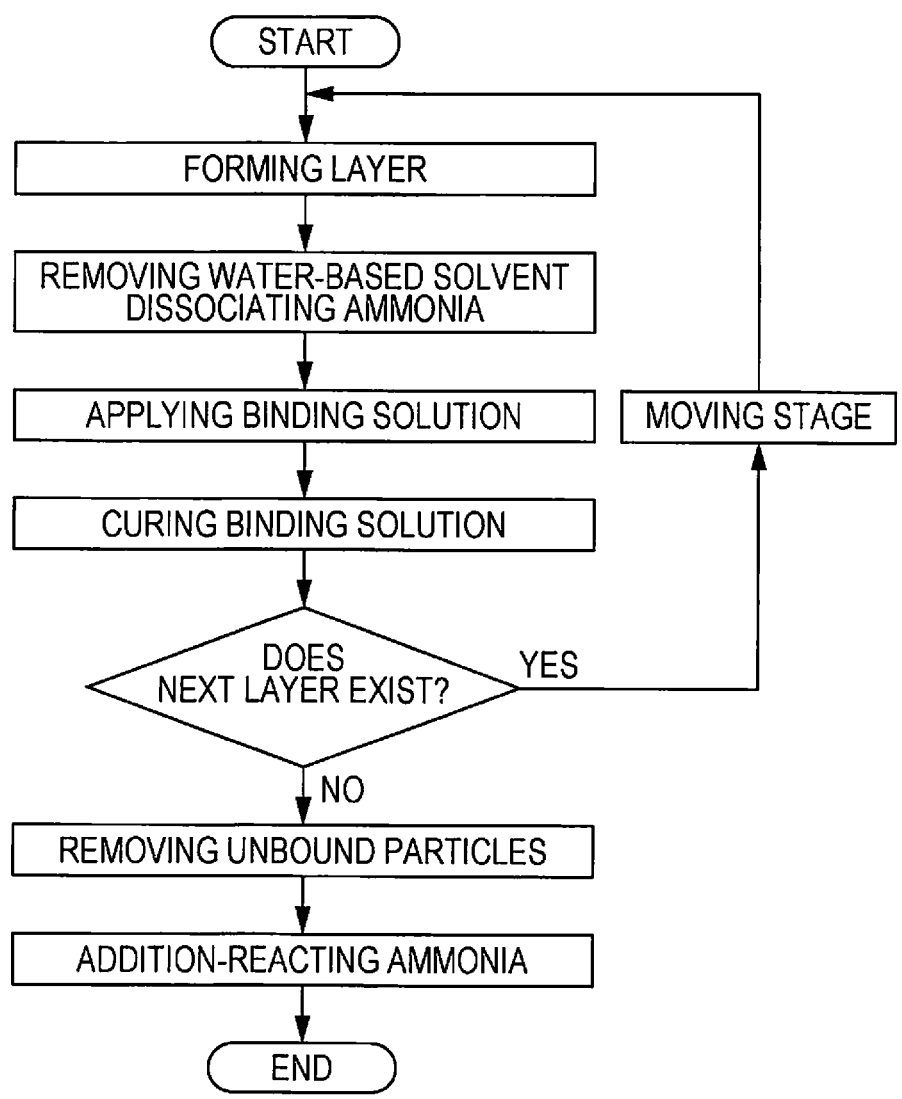
FIG. 3 is a flowchart showing an example of the method of manufacturing a three-dimensional structure of the invention.

Thereafter, a series of the processes are repeated (refer to FIGS. 1D, 2A, and 2B). Thus, in each of the layers 1, the particles are bound to the site on which the binding solution 2 has been applied, and, in this state, a three-dimensional structure 100 is obtained as a laminate in which the plurality of layers 1 are laminated (refer to FIG. 2C).

In the second and subsequent binding solution application processes (refer to FIG. 1D), the binding solution 2 applied on the layer 1 is used in binding the particles constituting this layer 1, and a part of the applied binding solution 2 adheres closely to the layer 1 located under this layer 1. For this reason, the binding solution 2 is used in binding the particles between adjacent layers as well as binding the particles in each of the layers 1. As a result, the finally obtained three-dimensional structure 100 becomes excellent in overall mechanical strength.

[Unbound Particle Removal Process]

After the aforementioned series of processes are repeated, in the particles constituting each of the layers 1, the unbound particle removal process (FIG. 2D) of removing the particles (unbound particles) not bound by the binder is performed. Thus, a three-dimensional structure 100 is obtained.

Examples of the specific methods of this process include a method of removing unbound particles by wiping with a brush or the like, a method of removing unbound particles by suction, a method of blowing gas such as air, a method of applying a liquid such as water (for example, method of dipping the above-obtained laminate in a liquid or a method of blowing a liquid), and a method of applying a vibration such as ultrasonic vibration. Here, these methods may be used in a combination of two or more.

Particularly, it is preferable that the removal of unbound particles is performed using a removing solution having a pH of 9 or more. Since the binding resin applied between the unbound particles, as described above, has a structure (for example, a structure of $R(-COOH)_m$) in which ammonia is dissociated from the binding resin contained in the three-dimension formation composition, this binding resin is not easily dissolved in a neutral liquid such as water. Accordingly, when the removing solution having a pH of 9 or more is used, the binding resin can be more easily dissolved, and thus the unbound particles can be more easily removed.

Examples of the removing solution having a pH of 9 or more may include liquids containing various alkaline materials including: inorganic alkaline materials, such as ammonia, sodium hydroxide, potassium hydroxide, calcium hydroxide, and magnesium hydroxide; and organic alkaline materials, such as monomethylamine, dimethylamine, trimethylamine, monoethylamine, diethylamine, triethylamine, and aniline. Further, as the alkaline material, a salt of weak acid and strong base, such as sodium acetate, may be used.

In this process, it is preferable that ammonia is used.

Thus, a chemical reaction of adding ammonia to the binding resin, from which ammonia is removed in the above-mentioned drying process, again can be processed, and thus the solubility of the binding resin contained in the unnecessary portion (region containing unbound particles) in a water-based solvent (particularly, water) can be improved, thereby making the removal efficiency of the unbound particles (unnecessary portion) using the liquid containing the water-based solvent particularly excellent. As a result, the productivity of the three-dimensional structure 100 can be made particularly excellent, and the involuntary remaining of the unnecessary portion can be more reliably prevented, thereby making the dimensional accuracy of the finally obtained three-dimensional structure 100 particularly excellent. Particularly, even when a targeted three-dimensional structure has a shape, such as width-narrow recess, depth-deep recess, or curved or bent recess, by which unbound particles (unnecessary portion) are less likely to be sufficiently removed by a mechanical method, it is possible to efficiently and sufficiently remove unbound particles (unnecessary portion) by using ammonia.

Here, ammonia may be used as a solution such as an aqueous solution, and may also be used as gas (ammonia gas). When ammonia gas is used, it is preferable that a liquid containing a water-based solvent is applied later. In this case, it is possible to more efficiently remove the unbound particles.

Further, in the case of using the removing solution, it is preferable that this process is carried out while heating the laminate.

Thus, removal efficiency of unbound particles (unnecessary portion) can be made particularly excellent. Particularly, even when a targeted three-dimensional structure, for example, is the above mentioned three-dimensional structure having a recess, the viscosity of the removing solution is lowered by heating, and thus the removing solution can easily permeate into the recess. As a result, even when the targeted three-dimensional structure has a shape, by which unbound particles (unnecessary portion) are less likely to be sufficiently removed, it is possible to efficiently and sufficiently remove unbound particles (unnecessary portion).

Treatment temperature in this process is not particularly limited, but is preferably 20 degrees Celsius to 100 degrees Celsius, and more preferably 25 degrees Celsius to 80 degrees Celsius.

Thus, it is possible to make the removal efficiency of unbound particles (unnecessary portion) particularly excellent while effectively preventing the involuntary denaturation and deterioration of the constituent material of the three-dimensional structure 100.

Further, when ammonia is used in the unbound particle removal process, it is preferable that heating treatment is performed after removing the unbound particles using ammonia.

Further, when the treatment using ammonia is performed in the above-mentioned unbound particle removal process, the binding resin contained in the real part of the three-dimensional structure 100, particularly, the binding resin contained in the vicinity of the surface of the three-dimensional structure 100 is likely to have a chemical structure to which ammonia is added. In contrast, when heating treatment is performed after removing the unbound particles using ammonia, ammonia can be dissociated from such a binding resin again, and thus the hydrophobicity of the binding resin can be made high. As a result, it is possible to make the water resistance and durability of the three-dimensional structure 100 particularly excellent.

It is preferable that such heating treatment is carried out under an environment containing no ammonia, or is carried out after washing the three-dimensional structure 100 being in contact with ammonia.

Thus, it is possible to more efficiently remove ammonia form the three-dimensional structure 100.

When the heating treatment is performed after the treatment using ammonia in the unbound particle removal process, the heating temperature at the time of this heating treatment is not particularly limited, but is preferably 30 degrees Celsius to 140 degrees Celsius, and more preferably 40 degrees Celsius to 120 degrees Celsius.

Thus, it is possible to more efficiently remove ammonia from the three-dimensional structure 100 while efficiently preventing the involuntary denaturation and deterioration of the constituent material of the three-dimensional structure 100.

The above-mentioned method of manufacturing a three-dimensional structure is summarized in the flowchart shown in FIG. 3.

According to the above-mentioned method of manufacturing a three-dimensional structure of the invention, it is possible to obtain a three-dimensional structure with excellent dimensional accuracy.

(2. Three-Dimension Formation Composition)

Next, a three-dimension formation composition will be described in detail.

The three-dimension formation composition contains a plurality of particles, a binding resin, and a water-based solvent.

Hereinafter, each component will be described in detail.

[Particle]

The three-dimension formation composition contains particles.

As the constituent materials of the particles, for example, inorganic materials, organic materials, and complexes thereof are exemplified.

As the inorganic material constituting the particle, for example, various metals and metal compounds are exemplified. Examples of the metal compounds include: various metal oxides, such as silica, alumina, titanium oxide, zinc oxide, zirconium oxide, tin oxide, magnesium oxide, and potassium titanate; various metal hydroxides, such as magnesium hydroxide, aluminum hydroxide, and calcium hydroxide; various metal nitrides, such as silicon nitride, titanium nitride, and aluminum nitride; various metal carbides, such as silicon carbide and titanium carbide; various metal sulfides, such as zinc sulfide; various metal carbonates, such as calcium carbonate and magnesium carbonate; various metal sulfates, such as calcium sulfate and magnesium sulfate; various metal silicates, such as calcium silicate and magnesium silicate; various metal phosphates, such as calcium phosphate; various metal borates, such as aluminum borate and magnesium borate; complexes thereof; and gypsum (each hydrate of calcium sulfate, anhydride of calcium sulfate, and the like).

As the organic material constituting the particle, synthetic resins and natural polymers are exemplified. Specific examples of the organic material include polyethylene resins; polypropylene; polyethylene oxide; polypropylene oxide; polyethylene imine; polystyrene; polyurethane; polyurea; polyester; silicone resins; acrylic silicone resins; a polymer containing (meth)acrylic ester as a constituent monomer, such as polymethyl methacrylate; a crosspolymer (ethylene-acrylic acid copolymer resin or the like) containing (meth)acrylic ester as a constituent monomer, such as methyl methacrylate crosspolymer; polyamide resins, such as nylon 12, nylon 6 and copolymerized nylon; polyimide; carboxymethyl cellulose; gelatin; starch; chitin; chitosan; and polycarbonates.

Among these, the particle is preferably made of an inorganic material, more preferably made of a metal oxide, and further preferably made of silica. Thus, it is possible to make the characteristics, such as mechanical strength and light resistance, of the three-dimensional structure 100 particularly excellent. Further, due to excellent fluidity, silica is advantageous to the formation of a layer 1 having higher thickness uniformity, and it is possible to make the productivity and dimensional accuracy of the three-dimensional structure 100 particularly excellent.

The average particle diameter of the particles is not particularly limited, but is preferably 1 micrometer to 25 micrometers, and more preferably 1 micrometer to 10 micrometers. Thus, it is possible to make the mechanical strength of the three-dimensional structure 100 particularly excellent, it is possible to more effectively prevent the occurrence of involuntary unevenness in the manufactured three-dimensional structure 100, and it is possible to make the dimensional accuracy of the three-dimensional structure 100 particularly excellent. Further, when the fluidity of the particles or the fluidity of the three-dimension formation composition is made particularly excellent, it is possible to make the productivity of the three-dimensional structure 100 particularly excellent. In the invention, the average particle diameter refers to a volume average particle diameter, and can be obtained by measuring a dispersion liquid, which is prepared by adding a sample to methanol and dispersing the sample in methanol for 3 minutes using an ultrasonic disperser, using an aperture of 50 micrometers in a particle size distribution measuring instrument (for example, TA-II, manufactured by Coulter Electronics Inc.) using a coulter counter method.

The $D_{max}$ of the particle is preferably 3 micrometers to 40 micrometers, and more preferably 5 micrometers to 30 micrometers. Thus, it is possible to make the mechanical strength of the three-dimensional structure 100 particularly excellent, it is possible to more effectively prevent the occurrence of involuntary unevenness in the manufactured three-dimensional structure 100, and it is possible to make the dimensional accuracy of the three-dimensional structure 100 particularly excellent. Further, when the fluidity of the three-dimension formation composition is made particularly excellent, it is possible to make the productivity of the three-dimensional structure 100 particularly excellent. Moreover, it is possible to more effectively prevent the scattering of light caused by the particles in the surface of the manufactured three-dimensional structure 100.

The particle may have any shape, but, preferably, has a spherical shape. Thus, when the fluidity of the three-dimension formation composition is made particularly excellent, it is possible to make the productivity of the three-dimensional structure 100 particularly excellent. Further, it is possible to more effectively prevent the occurrence of involuntary unevenness in the manufactured three-dimensional structure 100, and it is possible to make the dimensional accuracy of the three-dimensional structure 100 particularly excellent. Moreover, it is possible to more effectively prevent the scattering of light caused by the particles in the surface of the manufactured three-dimensional structure 100.

The content ratio of particles in the three-dimension formation composition is preferably 5 mass % to 80 mass %, and more preferably 10 mass % to 70 mass %. Thus, the fluidity of the three-dimension formation composition can be made sufficiently excellent, and the mechanical strength of the finally obtained three-dimensional structure 100 can be made particularly excellent.

[Binding Resin]

The three-dimension formation composition contains a plurality of particles and a binding resin. By allowing the three-dimension formation composition to contain the binding resin, the particles are bound (temporarily fixed) together to effectively prevent the involuntary scattering of the particles. Thus, it is possible to improve the safety of workers or the dimensional accuracy of the manufactured three-dimensional structure 100.

The binding resin contained in the three-dimension formation composition has an ammonium salt of a carboxyl group as a functional group.

The binding resin is configured such that it can be easily and reliably changed from a high hydrophilic state to a high hydrophobic state due to the dissociation of ammonia by heating. It is possible to achieve both the effect caused by the high hydrophilic state of the binding resin and the effect caused by the high hydrophobic state of the binding resin.

Specifically, in the three-dimension formation composition, since the binding resin has a high hydrophilic state, that is, a structure of an ammonium salt of a carboxyl group, the binding resin can be suitably dissolved in a water-based solvent. Therefore, at the time of forming the layer 1, the fluidity of the three-dimension formation composition can be made excellent, and, in the layer 1 after drying, the binding resin can be adhered around the particles at high uniformity, the stability of shape of the layer 1 can be made particularly excellent, and thus it is possible to more suitably prevent the problem of scattering of the particles.

On the other hand, after the formation of the layer 1, since the binding resin has a high hydrophobic state, that is, a structure in which ammonia is dissociated from an ammonium salt of a carboxyl group, when a second layer 1 and subsequent layers 1 are formed using the three-dimension formation composition, it is possible to effectively prevent the layer 1 disposed under a new layer 1, that is, the layer 1 subjected to the drying process from being deformed by the water-based solvent contained in the three-dimension formation composition used in the formation of the new layer 1. As a result, it is possible to manufacture the three-dimensional structure 100 with high dimensional accuracy. Further, it is possible to make the water resistance of the finally-obtained three-dimensional structure 100 excellent.

Further, the binding resin is configured such that it can be easily and reliably changed from a high hydrophilic state to a high hydrophobic state due to the dissociation of ammonia, and a chemical structure of an ammonium salt of a carboxyl group is easily and reliably introduced again by reacting with ammonia in a state in which ammonia is dissociated. For this reason, in the above-mentioned unbound particle removal process, it is possible to efficiently remove unbound particles (unnecessary portion), and thus it is possible to make the productivity of the three-dimensional structure 100 excellent.

Further, the binding resin contained in the three-dimension formation composition may have a structure of an ammonium salt of a carboxyl group, but, preferably, has a structure of acid anhydride which is formed by heating.

In this case, since the rate of reduction of hydrophilicity of the binding resin before and after the dissociation reaction of ammonium can be made particularly large and the hydrophobicity of the binding resin after the dissociation reaction of ammonium can be made particularly high, when the second layer 1 and subsequent layers are formed, it is possible to effectively prevent the layer 1 disposed under this upper layer 1 from being deformed, and thus it is possible to make the dimensional accuracy of the three-dimensional structure 100 particularly excellent. Further, when the binding resin contained in the finally obtained three-dimensional structure 100 is a binding resin from which ammonium is dissociated, it is possible to make the water resistance and durability of the three-dimensional structure 100 particularly excellent. Further, the binding resin having a structure of acid anhydride, which is formed by heating, is configured such that a chemical reaction with ammonia is more easily performed, and an amide group and a structure of an ammonium salt of a carboxyl group are introduced into this binding resin by the chemical reaction. Due to the introduction of such a chemical structure, it is possible to efficiently remove the unbound particles (unnecessary portion), and thus it is possible to make the productivity of the three-dimensional structure 100 particularly excellent.

Further, it is preferable that the binding resin contained in the three-dimension formation composition has a cyclic chemical structure which is formed by heating.

In this case, due to the dissociation of ammonia, the hydrophobicity of the binding resin in a state in which the cyclic chemical structure is formed can be made particularly high, and thus the above-mentioned effect obtained by increasing the hydrophobicity of the binding resin can be more remarkably exhibited. Further, when the cyclic chemical structure is formed by the dissociation of ammonia, steric hindrance, occurring when a chemical reaction of introducing a chemical structure of an ammonium salt of a carboxyl group into the binding resin again is processed through a chemical reaction with ammonia, becomes small, and thus this chemical reaction is more efficiently processed. Further, the expansion rate of the binding resin by a chemical reaction with ammonia becomes large, and thus it is possible to make the removal efficiency of the unbound particles (unnecessary portion) in the unbound particle removal process particularly excellent. For this reason, it is possible to make the productivity of the three-dimensional structure 100 particularly excellent.

Examples of the cyclic chemical structure include a structure of acid anhydride, a lactone structure, a lactam structure, and an imide structure. In addition, structures other than acid anhydride are exemplified.

When the cyclic chemical structure is formed by the dissociation of ammonia, this chemical reaction may be processed between molecules, and may also be processed in a molecule. However, it is preferable that at least a part of the chemical reaction is processed in a molecule.

In this case, the above-mentioned effects are more remarkably exhibited.

When the binding resin contained in the three-dimension formation composition has a cyclic chemical structure which is formed by heating, it is preferable that this cyclic chemical structure is five-membered or six-membered cyclic chemical structure.

In this case, due to the dissociation of ammonia, the hydrophobicity of the binding resin in a state in which the cyclic chemical structure is formed can be made further high, and thus the above-mentioned effect obtained by increasing the hydrophobicity of the binding resin can be more remarkably exhibited. Further, steric hindrance, occurring when a chemical reaction of introducing a chemical structure of an ammonium salt of a carboxyl group into the binding resin again is processed through a chemical reaction with ammonia, becomes small, and thus this chemical reaction is more efficiently processed, so as to make the productivity of the three-dimensional structure 100 particularly excellent.

It is preferable that the binding resin has an amide group (—CONH$_2$) together with an ammonium salt of a carboxyl group in a molecule.

In this case, a chemical reaction of an ammonium salt of a carboxyl group with an amide group (—CONH$_2$) can be processed by heating, and thus a structure of acid anhydride (—COOCO—) can be introduced into the binding resin, so as to obtain the above-mentioned effects. Particularly, when the binding resin has an amide group (—CONH$_2$) and an ammonium salt of a carboxyl group in the molecule thereof, it is possible to more efficiently process the chemical reaction, and thus it is possible to make the productivity of the three-dimensional structure 100 particularly excellent. Further, it is possible to suitably introduce the above-mentioned cyclic structure into the molecule of the binding resin, and thus it is possible to obtain the above-mentioned effects.

An example, in which ammonia is dissociated from a reaction product of an isobutylene-maleic anhydride copolymer, as a binding resin having an amide group (—CONH$_2$) together with an ammonium salt of a carboxyl group, with ammonia by a reaction in a molecule to form a structure of acid anhydride (—COOCO—), is represented by formula below.

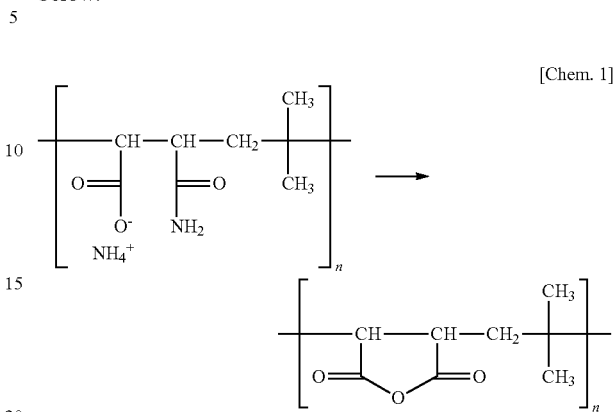

[Chem. 1]

In the formula above, in the binding resin contained in the three-dimension formation composition, it is shown that all of the maleic anhydride, as a monomer constituting a reaction product of an olefin-maleic anhydride copolymer with ammonia, reacts with ammonia. However, the reaction product of an olefin-maleic anhydride copolymer with ammonia, the reaction product being contained in the three-dimension formation composition, may be a product obtained by reacting a part of maleic anhydride, as a monomer constituting the reaction product, with ammonia, and maleic anhydride, as a monomer constituting the reaction product, may hold a structure of acid anhydride without reacting with ammonia.

The three-dimension formation composition may contain a binding resin having an ammonium salt of a carboxyl group as a functional group. Here, it is preferable that this binding resin is one or two or more selected from the group consisting of a reaction product of an olefin-maleic anhydride copolymer with ammonia, a polyacrylic acid ammonium salt, an ammonium salt of carboxymethyl cellulose, a polystyrene carboxylic acid ammonium salt, an ammonium salt of an acrylamide-acrylic acid copolymer, and an alginic acid ammonium salt.

In this case, it is possible to make the fluidity of the three-dimension formation composition or the fixing force of temporary fixing of the particles in the layer 1 particularly excellent, and it is possible to suitably process the dissociation reaction of ammonia from the binding resin or the addition reaction of ammonia into the binding resin from which ammonia is dissociated, and thus it is possible to make the productivity of the three-dimensional structure 100 particularly excellent.

Particularly, when the binding resin constituting the three-dimension formation composition contains a reaction product of an olefin-maleic anhydride copolymer with ammonia or an ammonium salt of an acrylamide-acrylic acid copolymer, it is possible to suitably form the above-mentioned structure of acid anhydride with particularly excellent reactivity. In particular, through the reaction in the molecule, it is possible to form the structure of acid anhydride, as a five-membered or six-membered cyclic structure, with particularly excellent reactivity.

Examples of olefin, as a monomer component constituting the reaction product of an olefin-maleic anhydride copolymer with ammonia, include isobutylene, styrene, and ethylene.

Further, the binding resin may be a reaction product of a vinyl acetate-maleic anhydride copolymer or a methyl vinyl ether-maleic anhydride copolymer with ammonia.

The weight average molecular weight of the binding resin contained in the three-dimension formation composition is not particularly limited, but is preferably 50000 to 200000, and more preferably 70000 to 180000.

Thus, the fixing force of binding (temporarily fixing) particles together is made particularly excellent, and thus it is possible to more effectively prevent the involuntary scattering of particles, and it is possible to more efficiently perform the removal of the unnecessary portion in the unbound particle removal process. As a result, it is possible to further improve the dimensional accuracy of the three-dimensional structure 100, and it is possible to make the productivity of the three-dimensional structure 100 particularly excellent.

The content ratio of the binding resin having a chemical structure of an ammonium salt of a carboxyl group in the three-dimension formation composition, based on the volume of particles, is preferably 20 vol % or less, and more preferably 1 vol % to 5 vol %. In this case, the above-mentioned function of the binding resin can be sufficiently exhibited, and thus the mechanical strength of the three-dimensional structure 100 can be made particularly excellent.

[Water-Based Solvent]

The three-dimension formation composition may contain a water-based solvent in addition to the above-mentioned binding resin and particles. Thus, the fluidity of the three-dimension formation composition becomes excellent, and thus, it is possible to make the productivity of the three-dimensional structure 100 excellent. Further, it is possible to effectively prevent the involuntary variation in thickness of the layer 1, and thus it is possible to make the dimensional accuracy of the three-dimensional structure 100 excellent.

Examples of the water-based solvent constituting the three-dimension formation composition include water; alcoholic solvents, such as methanol, ethanol, and isopropanol; ketone-based solvents, such as methyl ethyl ketone and acetone; glycol ether-based solvents, such as ethylene glycol monoethyl ether and ethylene glycol monobutyl ether; glycol ether acetate-based solvents, such as propylene glycol 1-monomethyl ether 2-acetate and propylene glycol 1-monomethyl ether 2-acetate; polyethylene glycol; and polypropylene glycol. They can be used alone or in a combination of two or more selected therefrom.

Preferably, the three-dimension formation composition contains water. Therefore, the binding resin can be more reliably dissolved, and thus the fluidity of the three-dimension formation composition or the composition uniformity of the layer 1 formed using the three-dimension formation composition can be made particularly excellent. Further, water is easily removed after the formation of the layer 1, and does not negatively influence the three-dimension formation composition even when it remains in the three-dimensional structure 100. Moreover, water is advantageous in terms of safety for the human body and environmental issues.

The content ratio of the water-based solvent in the three-dimension formation composition is preferably 5 mass % to 80 mass %, and more preferably 20 mass % to 80 mass %. Thus, the aforementioned effects due to containing the water-based solvent can be more remarkably exhibited, and, in the process of manufacturing the three-dimensional structure 100, the water-based solvent can be easily removed in a short time, and thus it is advantageous in terms of improvement in productivity of the three-dimensional structure 100.

In particular, when the three-dimension formation composition contains water as the water-based solvent, the content ratio of water in the three-dimension formation composition is preferably 20 mass % to 85 mass %, and more preferably 20 mass % to 80 mass %. Thus, the above-mentioned effects are more remarkably exhibited.

[Other Components 1]

The three-dimension formation composition may contain components other than the aforementioned components. Examples of these components include a polymerization initiator, a polymerization accelerator, a dispersant, a binding resin not having a structure of ammonium salt of a carboxyl group as a functional group, a solvent other than the water-based solvent, a penetration enhancer, a wetting agent (humectant), a fixing agent, a fungicide, a preservative, an antioxidant, an ultraviolet absorber, a chelating agent, and a pH adjuster.

Examples of the binding resin not having a structure of ammonium salt of a carboxyl group include synthetic polymers, such as polyvinyl alcohol (PVA), polyvinyl pyrrolidone (PVP), polycaprolactone diol, sodium polyacrylate, polyacrylamide, modified polyamide, polyethylene imine, polyethylene oxide, and random copolymers of ethylene oxide and propylene oxide; natural polymers, such as corn starch, mannan, pectin, agar, alginic acid, dextran, glue, and gelatin; and semi-synthetic polymers, such as carboxymethyl cellulose, hydroxyethyl cellulose, oxidized starch, and modified starch. They can be used alone or in a combination of two or more selected therefrom.

Among these, when the binding resin is polyvinyl alcohol, the mechanical strength of the three-dimensional structure 100 can be made more excellent. Further, characteristics (for example, solubility in water, and the like) of the binding resin and characteristics (for example, viscosity, fixing force of particles, wettability, and the like) of the three-dimension formation composition can be suitably controlled by adjusting the saponification degree and the polymerization degree, and thus the three-dimension formation composition can be easily handled, thereby making the productivity of the three-dimensional structure 100 particularly excellent. Therefore, it is possible to appropriately cope with the manufacture of various three-dimensional structures 100. In addition, among various resins that can be used as the binding resin, polyvinyl alcohol is inexpensive, and the supply thereof is stable. Therefore, it is possible to stably manufacture the three-dimensional structure 100 while suppressing the production cost thereof.

Meanwhile, when polyvinyl alcohol is used as the binding resin, the above-mentioned excellent effects can be obtained, whereas there is a problem in that the water resistance of the finally obtained three-dimensional structure is deteriorated in the related art. In contrast, like the invention, when the three-dimension formation composition contains the binding resin having a structure of an ammonium salt of a carboxyl group, the water resistance of the three-dimensional structure can be made sufficiently excellent even when the three-dimensional structure further contains polyvinyl alcohol. In other words, in the invention, when using the three-dimension formation composition containing polyvinyl alcohol in addition to the binding resin having a structure of an ammonium salt of a carboxyl group, the water resistance of the finally obtained three-dimensional structure can be made excellent while obtaining the effects due to the use of polyvinyl alcohol. These effects are more remarkably exhibited when a reaction product of an olefin-maleic anhydride copolymer with ammonia is used, among the binding resins each having a structure of an ammonium salt of a carboxyl group.

When the three-dimension formation composition contains polyvinyl alcohol, the saponification degree of the polyvinyl alcohol is preferably 70 to 90. Thus, it is possible to suppress a decrease in solubility of polyvinyl alcohol in the water-based solvent (particularly, water). Therefore, it is possible to more effectively suppress the deterioration of the adhesiveness between adjacent layers 1.

When the three-dimension formation composition contains polyvinyl alcohol, the polymerization degree of the polyvinyl alcohol is preferably 300 to 2000.

Thus, the removal of unbound particles (unnecessary portion) can be more easily performed, and the mechanical strength of the finally obtained three-dimensional structure 100 can be made particularly excellent.

Further, when the three-dimension formation composition contains a binding resin (for example, polyacrylamide) having an amide group (—$CONH_2$) as the binding resin not having a structure of an ammonium salt of a carboxyl group, a structure of an acid anhydride can be suitably formed between the binding resin having a structure of an ammonium salt of a carboxyl group and the binding resin having an amide group (—$CONH_2$) by heating. Thus, the above-mentioned effects can be obtained.

In this way, the binding resin having a structure of an ammonium salt of a carboxyl group may be configures such that ammonia is dissociated by the chemical reaction with components other than the binding resin having a structure of an ammonium salt of a carboxyl group.

By such a configuration, a more easily available binding resin, as the binding resin having a structure of an ammonium salt of a carboxyl group or the component not having a structure of an ammonium salt of a carboxyl group, can be used, and thus it can contribute to the stable manufacturing of the three-dimensional structure 100 and the reduction in production cost of the three-dimensional structure 100. Further, the degree of freedom in design of the molecular weight or chemical structure of the binding resin having a structure of an ammonium salt of a carboxyl group or the component not having a structure of an ammonium salt of a carboxyl group increases, and thus it is possible to further improve the characteristics and productivity of the manufactured three-dimensional structure 100.

Such an effect can be more remarkably exhibited when polyacrylamide is used as the binding resin having an amide group (—$CONH_2$).

Meanwhile, even when the three-dimension formation composition contains a compound (for example, a compound functioning as a dispersant) other than the binding resin having an amide group (—$CONH_2$) instead of the binding resin having an amide group (—$CONH_2$), the above-mentioned effect is obtained.

When the three-dimension formation composition contains the binding resin not having a structure of an ammonium salt of a carboxyl group, it is preferable that the content ratio of the binding resin not having a structure of an ammonium salt of a carboxyl group in the three-dimension formation composition is lower than that of the binding resin having a structure of an ammonium salt of a carboxyl group in the three-dimension formation composition.

Thus, the effects caused by containing the binding resin having a structure of an ammonium salt of a carboxyl group are more remarkably exhibited.

More specifically, the content ratio of the binding resin not having a structure of an ammonium salt of a carboxyl group in the three-dimension formation composition is preferably 15 mass % or less, and more preferably 10 mass % or less.

Particularly, when the three-dimension formation composition contains polyvinyl alcohol, the content ratio of polyvinyl alcohol in the three-dimension formation composition is preferably 0.5 mass % to 10 mass %, and more preferably 1.0 mass % to 8 mass %.

Further, when the three-dimension formation composition contains a binding resin having an amide group (—$CONH_2$), such as polyacrylamide, as the binding resin not having a structure of an ammonium salt of a carboxyl group, the content ratio of the binding resin having an amide group (—$CONH_2$) in the three-dimension formation composition is preferably 0.5 mass % to 15 mass %, and more preferably 1.0 mass % to 10 mass %.

(3. Binding Solution)

Next, the binding solution used in manufacturing the three-dimensional structure of the invention will be described in detail.

The binding solution 2 contains at least a binder.

[Binder]

The binder is a component having a function of binding the particles together by curing.

The binder is not particularly limited, but it is preferable that a binder having hydrophobicity (lipophilicity) is used.

Thus, for example, the affinity of the binding solution 2 to this layer 1 containing the high-hydrophobicity binding resin having a chemical structure in which ammonia is dissociated in the drying process can be made particularly excellent. Thus, the repelling of the binding solution 2 on the layer 1 at the time of applying the binding solution 2 to the layer 1 is more effectively prevented, and thus the binding solution 2 can more easily penetrate into the layer 1. Accordingly, the dimensional accuracy and mechanical strength of the finally obtained three-dimensional structure 100 can be more reliably made particularly excellent. Further, when hydrophobically-treated particles are used, affinity between the binding solution 2 and the particles can be further increased, and the binding solution 2 can suitably penetrate into the pores of the particles when the binding solution 2 is applied to the layer 1. As a result, anchoring effects due to the binder are suitably exhibited, and thus it is possible to make the mechanical strength and water resistance of the finally obtained three-dimensional structure 100 excellent. Further, in the invention, the hydrophobic curable resin may have sufficiently low affinity to water, but, for example, it is preferable that the solubility of the hydrophobic curable resin in water at 25 degrees Celsius is 1 g/100 g water or less.

Examples of the binder include thermoplastic resins; thermosetting resins; various photocurable resins, such as a visible light-curable resin cured by light in a visible light region, an ultraviolet-curable resin, and an infrared curable resin; and X-ray curable resins. They can be used alone or in a combination of two or more selected therefrom. From the viewpoints of the mechanical strength of the obtained three-dimensional structure 100 or productivity of the three-dimensional structure 100, it is preferable that a curable resin is used as the binder. Further, among various curable resins, from the viewpoints of mechanical strength of the obtained three-dimensional structure 100, productivity of the three-dimensional structure 100, and storage stability of the binding solution 2, it is particularly preferable that an ultraviolet-curable resin (polymerizable compound) is used as the binder. Further, since the ultraviolet-curable resin is generally a material having high hydrophobicity, the affinity of the binding solution 2 to this layer 1 containing the high-hydrophobicity binding resin having a chemical structure in which ammonia is dissociated in the drying process can be made particularly excellent. Therefore, the repelling of the binding solution 2 on the layer 1 at the time of applying the binding solution 2 to the layer 1 is more effectively prevented, and thus the binding solution 2 can more easily penetrate into the layer 1. Accordingly, the dimensional accuracy and mechanical strength of the finally obtained three-dimensional structure 100 can be more reliably made particularly excellent.

As the ultraviolet-curable resin (polymerizable compound), an ultraviolet-curable resin, by which addition polymerization or ring-opening polymerization is initiated by radical species or cationic species resulting from a photopolymerization initiator using ultraviolet irradiation to prepare a polymer, is preferably used. The types of addition polymerization include radical polymerization, cationic polymerization, anionic polymerization, metathesis, and coordination polymerization. The types of ring-opening polymerization include cationic polymerization, anionic polymerization, radical polymerization, metathesis, and coordination polymerization.

As the addition-polymerizable compound, there is exemplified a compound having at least one ethylenically-unsaturated double bond. As the addition-polymerizable compound, a compound having at least one terminal ethylenically-unsaturated bond, and preferably two or more terminal ethylenically-unsaturated bonds can be preferably used.

An ethylenically-unsaturated polymerizable compound has a chemical form of a monofunctional polymerizable compound, a polyfunctional polymerizable compound, or a mixture thereof. Examples of the monofunctional polymerizable compound include unsaturated carboxylic acids (for example, acrylic acid, methacrylic acid, itaconic acid, crotonic acid, isocrotonic acid, and maleic acid), esters thereof, and amides thereof. Examples of the polyfunctional polymerizable compound include esters of unsaturated carboxylic acids and aliphatic polyol compounds, and amides of unsaturated carboxylic acids and aliphatic polyvalent amine compounds.

Further, addition reaction products of unsaturated carboxylic esters or amides having a nucleophilic substituent, such as a hydroxyl group, an amino group, or a mercapto group, with isocyantes or epoxies; and dehydration condensation reaction products of such unsaturated carboxylic esters or amides with carboxylic acids can also be used. Moreover, addition reaction products of unsaturated carboxylic esters or amides having an electrophilic substituent, such as an isocyanate group or an epoxy group, with alcohols, amines, and thiols; and substitution reaction products of unsaturated carboxylic esters or amides having a leaving group, such as a halogen group or a tosyloxy group, with alcohols, amines and thiols can also be used.

Specific examples of radical polymerizable compounds, which are esters of unsaturated carboxylic acids and aliphatic polyol compounds, include (meth)acrylic esters. Among these (meth)acrylic esters, anyone of monofunctional (meth)acrylic esters and polyfunctional (meth)acrylic esters can also be used.

Specific examples of monofunctional (meth)acrylates include tolyloxyethyl (meth)acrylate, phenyloxyethyl (meth)acrylate, cyclohexyl (meth)acrylate, ethyl (meth) acrylate, methyl (meth)acrylate, isobornyl (meth)acrylate, tetrahydrofurfuryl (meth)acrylate, phenoxyethyl acrylate, 2-hydroxy-3-phenoxypropyl acrylate, and 4-hydroxybutyl (meth)acrylate.

Specific examples of difunctional (meth)acrylates include ethylene glycol di(meth)acrylate, triethylene glycol di(meth) acrylate, 1,3-butanediol di(meth)acrylate, tetramethylene glycol di(meth)acrylate, propylene glycol di(meth)acrylate, neopentyl glycol di(meth)acrylate, hexanediol di(meth)acrylate, 1,4-cyclohexanediol di(meth)acrylate, tetraethylene glycol di(meth)acrylate, pentaerythritol di(meth)acrylate, dipentaerythritol di(meth)acrylate, 2-(2-vinyloxyethoxy) ethyl (meth)acrylate, dipropylene glycol diacrylate, and tripropylene glycol diacrylate.

Specific examples of trifunctional (meth)acrylates include trimethylolpropane tri(meth)acrylate, trimethylolethane tri (meth)acrylate, alkylene oxide-modified tri(meth)acrylate of trimethylolpropane, pentaerythritol tri(meth)acrylate, dipentaerythritol tri(meth)acrylate, trimethylolpropane tri((meth) acryloyloxypropyl) ether, isocyanuric acid alkylene oxide-modified tri(meth)acrylate, propionic acid dipentaerythritol tri(meth)acrylate, tri((meth)acryloyloxyethyl) isocyanurate, hydroxypivalaldehyde-modified dimethylolpropane tri (meth)acrylate, and sorbitol tri(meth)acrylate.

Specific examples of tetrafunctional (meth)acrylates include pentaerythritol tetra(meth)acrylate, sorbitol tetra(meth)acrylate, ditrimethylolpropane tetra(meth)acrylate, propionic acid dipentaerythritol tetra(meth)acrylate, and ethoxylated pentaerythritol tetra(meth)acrylate.

Specific examples of pentafunctional (meth)acrylates include sorbitol penta(meth)acrylate and dipentaerythritol penta(meth)acrylate.

Specific examples of hexafunctional (meth)acrylates include dipentaerythritol hexa(meth)acrylate, sorbitol hexa (meth)acrylate, alkylene oxide-modified hexa(meth)acrylate of phosphazene, and caprolactone-modified dipentaerythritol hexa(meth)acrylate.

Examples of polymerizable compounds other than (meth) acrylates include itaconic acid esters, crotonic acid esters, isocrotonic acid esters, and maleic acid esters.

Examples of itaconic acid esters include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate.

Examples of crotonic acid esters include ethylene glycol dicrotonate, tetramethylene glycol dicrotonate, pentaerythritol dicrotonate, and sorbitol tetracrotonate.

Examples of isocrotonic acid esters include ethylene glycol diisocrotonate, pentaerythritol diisocrotonate, and sorbitol tetraisocrotonate.

Examples of maleic acid esters include ethylene glycol dimaleate, triethylene glycol dimaleate, pentaerythritol dimaleate, and sorbitol tetramaleate.

Specific examples of monomers of amides of unsaturated carboxylic acids and aliphatic polyvalent amine compounds include methylene bis-acrylamide, methylene bis-methacrylamide, 1,6-hexamethylene bis-acrylamide, 1,6-hexamethylene bis-methacrylamide, diethylenetriamine tris-acrylamide, xylylene bisacrylamide, and xylylene bismethacrylamide.

Further, a urethane-based addition-polymerizable compound prepared using the addition reaction of isocyanate and a hydroxyl group is also preferable.

In the invention, a cationic ring-opening polymerizable compound having at least one cyclic ether group such as an epoxy group or an oxetane group in a molecule can be suitably used as an ultraviolet-curable resin (polymerizable compound).

Examples of the cationic polymerizable compound include curable compounds containing a ring-opening polymerizable group. Among these, a curable compound containing a heterocyclic group is particularly preferable. Examples of such curable compounds include epoxy derivatives, oxetane derivatives, tetrahydrofuran derivatives, cyclic lactone derivatives, cyclic carbonate derivatives, cyclic imino ethers such as oxazoline derivatives, and vinyl ethers. Among them, epoxy derivatives, oxetane derivatives, and vinyl ethers are preferable.

Examples of preferable epoxy derivatives include monofunctional glycidyl ethers, polyfunctional glycidyl ethers, monofunctional alicyclic epoxies, and polyfunctional alicyclic epoxies.

Examples of specific compounds of glycidyl ethers include diglycidyl ethers (for example, ethylene glycol diglycidyl ether, bisphenol A diglycidyl ether, and the like), tri- or higher functional glycidyl ethers (for example, trimethylolethane triglycidyl ether, trimethylolpropane triglycidyl ether, glycerol triglycidyl ether, triglycidyl tris-hydroxyethyl isocyanurate, and the like), tetra- or higher functional glycidyl ethers (for example, sorbitol tetraglycidyl ether, pentaerythritol tetraglycidyl ether, polyglycidyl ethers of cresol novolac resins, polyglycidyl ethers of phenolic novolac resin, and the like), alicyclic epoxies, and oxetanes.

As the polymerizable compound, an alicyclic epoxy derivative can be preferably used. The "alicyclic epoxy group" refers to a partial structure in which a double bond of a ring of a cycloalkene group such as a cyclopentene group or a cyclohexene group is epoxidized with a suitable oxidant such as hydrogen peroxide or peracid.

As the alicyclic epoxy compound, polyfunctional alicyclic epoxy compounds having two or more cyclohexene oxide groups or cyclopentene oxide groups in one molecule are preferable. Specific examples of the alicyclic epoxy compound include 4-vinylcyclohexene dioxide, (3,4-epoxycyclohexyl)methyl-3,4-epoxycyclohexyl carboxylate, di-(3,4-epoxycyclohexyl) adipate, di-(3,4-epoxycyclohexylmethyl) adipate, bis-(2,3-epoxy cyclopentyl) ether, di-(2,3-epoxy-6-methylcyclohexyl methyl) adipate, and dicyclopentadiene dioxide.

A general glycidyl compound having an epoxy group, which does not have an alicyclic structure in a molecule, can be used alone or in combination with the above alicyclic epoxy compound.

Examples of the general glycidyl compound include glycidyl ether compounds and glycidyl ester compounds. It is preferable to use glycidyl ether compounds.

Specific examples of glycidyl ether compounds include: aromatic glycidyl ether compounds, such as 1,3-bis(2,3-epoxypropyloxy) benzene, bisphenol A epoxy resins, bisphenol F epoxy resins, phenol novolac epoxy resins, cresol novolac epoxy resins, and trisphenolmethane epoxy resin; and aliphatic glycidyl ether compounds, such as 1,4-butanediol glycidyl ether, glycerol triglycidyl ether, propylene glycol diglycidyl ether, and trimethylolpropane triglycidyl ether. Examples of glycidyl esters may include glycidyl esters of a linolenic acid dimer.

As the polymerizable compound, a compound having an oxetanyl group which is a cyclic ether of a four-membered ring (hereinafter, simply referred to as "oxetane compound") can be used. The oxetanyl group-containing compound is a compound having one or more oxetanyl groups in one molecule.

Particularly, the binding solution 2 preferably contains at least one selected from the group consisting of 2-(2-vinyloxyethoxy) ethyl acrylate, phenoxyethyl acrylate, and dipropylene glycol diacrylate, among the above-mentioned polymerizable compounds.

These polymerizable compounds have particularly excellent affinity to the layer 1 containing the high-hydrophobicity binding resin having a chemical structure in which ammonia is dissociated in the drying process. Therefore, the repelling of the binding solution 2 on the layer 1 at the time of applying the binding solution 2 to the layer 1 is more effectively prevented, and thus the binding solution 2 can more easily penetrate into the layer 1. Accordingly, the dimensional accuracy and mechanical strength of the finally obtained three-dimensional structure 100 can be made more excellent.

The content ratio of the binder in the binding solution 2 is preferably 80 mass % or more, and more preferably 85 mass % or more. In this case, it is possible to make the mechanical strength of the finally obtained three-dimensional structure 100 particularly excellent.

[Other Components 2]

The binding solution 2 may contain other components in addition to the above-mentioned components. Examples of these components include various colorants such as pigments and dyes; dispersants; surfactants; polymerization initiators; polymerization accelerators; solvents; penetration enhancers; wetting agents (humectants); fixing agents; fungicides; preservatives; antioxidants; ultraviolet absorbers; chelating agents; pH adjusters; thickeners; fillers; aggregation inhibitors; and defoamers.

Particularly, when the binding solution 2 contains the colorant, it is possible to obtain a three-dimensional structure 100 colored in a color corresponding to the color of the colorant.

Particularly, when the binding solution 2 contains pigment as the colorant, it is possible to make the light resistance of the binding solution 2 or the three-dimensional structure 100 good. As the pigment, both inorganic pigments and organic pigments can be used.

Examples of inorganic pigments include carbon blacks (C.I. Pigment Black 7) such as furnace black, lamp black, acetylene black, and channel black; iron oxides; titanium oxides; and the like. They can be used alone or in a combination of two or more selected therefrom.

Among these inorganic pigments, in order to exhibit preferable white color, titanium oxide is preferable.

Examples of organic pigments include azo pigments such as insoluble azo pigments, condensed azo pigments, azo lakes, and chelate azo pigments; polycyclic pigments such as phthalocyanine pigments, perylene and perinone pigments, anthraquinone pigments, quinacridone pigments, dioxane pigments, thioindigo pigments, isoindolinone pigments, and quinophthalone pigments; dye chelates (for example, basic dye chelates, acidic dye chelates, and the like); staining lakes (basic dye lakes, acidic dye lakes); nitro pigments; nitroso pigments; aniline blacks; and daylight fluorescent pigments. They can be used alone or in a combination of two or more selected therefrom.

When the binding solution 2 contains a colorant, the content ratio of the colorant in the binding solution 2 is preferably 1 mass % to 20 mass %. Thus, particularly excellent hiding properties and color reproducibility are obtained.

Particularly, when the binding solution 2 contains titanium oxide as the colorant, the content ratio of titanium oxide in the binding solution 2 is preferably 12 mass % to 24 mass %, and more preferably 14 mass % to 20 mass %. Thus, particularly excellent hiding properties and sedimentation recovery properties are obtained.

When the binding solution 2 contains a dispersant in addition to a pigment, the dispersibility of the pigment can be further improved. As a result, it is possible to more effectively suppress the partial reduction in mechanical strength due to the bias of the pigment.

The dispersant is not particularly limited, but examples thereof include dispersants, such as a polymer dispersant, generally used in preparing a pigment dispersion liquid. Specific examples of the polymer dispersants include polymer dispersants containing one or more of polyoxyalkylene polyalkylene polyamine, vinyl-based polymers and copolymers, acrylic-based polymers and copolymers, polyesters, polyamides, polyimides, polyurethanes, amino-based polymers, silicon-containing polymers, sulfur-containing polymers, fluorinated polymers, and epoxy resins, as main components thereof.

When the binding solution 2 contains a surfactant, the penetrability into the layer 1 and the abrasion resistance of the three-dimensional structure 100 can be improved. The surfactant is not particularly limited, but examples thereof include silicone-based surfactants such as polyester-modified silicone, and polyether-modified silicone. Among these, polyether-modified polydimethylsiloxane or polyester-modified polydimethylsiloxane is preferably used.

The binding solution 2 may contain a solvent. Thus, the viscosity of the binding solution 2 can be suitably adjusted, and the discharge stability of the binding solution 2 using an ink jet method can be made particularly excellent even when the binding solution 2 contains a component having high viscosity.

Examples of the solvent include (poly)alkylene glycol monoalkyl ethers, such as ethylene glycol monomethyl ether, ethylene glycol monoethyl ether, propylene glycol monomethyl ether, and propylene glycol monoethyl ether; acetic acid esters, such as ethyl acetate, n-propyl acetate, iso-propyl acetate, n-butyl acetate, and iso-butyl acetate; aromatic hydrocarbons, such as benzene, toluene, and xylene; ketones, such as methyl ethyl ketone, acetone, methyl isobutyl ketone, ethyl-n-butyl ketone, diisopropyl ketone, and acetylacetone; alcohols, such as ethanol, propanol, and butanol. They can be used alone or in a combination of two or more selected therefrom.

The viscosity of the binding solution 2 is preferably 10 mPa*s to 25 mPa*s, and more preferably 15 mPa*s to 20 mPa*s. Thus, the discharge stability of the binding solution 2 by an inkjet method can be made particularly excellent. In the present specification, viscosity refers to a value measured at 25° C. using an E-type viscometer (for example, VISCONIC ELD, manufactured by TOKYO KEIKI INC.), unless conditions are otherwise designated.

Meanwhile, in the manufacture of the three-dimensional structure 100, a plurality of kinds of binding solutions 2 may be used.

For example, a binding solution 2 (color ink) containing a colorant and a binding solution 2 (clear ink) containing no colorant may be used. Thus, for example, for the appearance of the three-dimensional structure 100, the binding solution 2 containing a colorant may be used as a binding solution 2 applied to the region influencing color tone, and, for the appearance of the three-dimensional structure 100, the binding solution 2 containing no colorant may be used as a binding solution 2 applied to the region not influencing color tone. Further, in the finally obtained three-dimensional structure 100, a plurality of kinds of binding solutions 2 may be used in combination with each other such that the region (coating layer) formed using the binding solution 2 containing no colorant is provided on the outer surface of the region formed using the binding solution 2 containing a colorant.

For example, a plurality of kinds of binding solutions 2 containing colorants having different compositions from each other may be used. Thus, a wide color reproducing area that can be expressed can be realized by the combination of these binding solutions 2.

When the plurality of kinds of binding solutions 2 are used, it is preferable that at least an indigo-violet (cyan) binding solution 2, a red-violet (magenta) binding solution 2, and a yellow binding solution 2 are used. Thus, a wider color reproducing area that can be expressed can be realized by the combination of these binding solutions 2.

Further, for example, the following effects are obtained by the combination of a white binding solution 2 and another colored binding solution 2. That is, the finally obtained three-dimensional structure 100 can have a first area on which a white binding solution 2 is applied, and a second area which overlaps with the first area and is provided outside the first area and on which a binding solution 2 having a color other than white color is applied. Thus, the first area on which a white binding solution 2 is applied can exhibit hiding properties, and the color saturation of the three-dimensional structure 100 can be enhanced.

(4. Three-Dimensional Structure)

The three-dimensional structure of the invention can be manufactured using the above-mentioned method of manufacturing a three-dimensional structure. Thus, it is possible to provide a three-dimensional structure with excellent dimensional accuracy.

Applications of the three-dimensional structure of the invention are not particularly limited, but examples thereof include appreciated and exhibited objects such as dolls and figures; and medical instruments such as implants; and the like.

In addition, the three-dimensional structure of the invention may be applied to prototypes, mass-produced products, made-to-order goods, and the like.

Although preferred embodiments of the invention have been described, the invention is not limited thereto.

More specifically, for example, it has been described in the aforementioned embodiment that, in addition to the layer forming process, the drying process, and the binding solution application process, the curing process is also repeated in conjunction with the layer forming process, the drying process, and the binding solution application process. However, the curing process may not be repeated. For example, the curing process may be carried out collectively after forming a laminate having a plurality of layers that are not cured.

In the method of manufacturing a three-dimensional structure according to the invention, if necessary, a pre-treatment process or a post-treatment process may be carried out.

As an example of the pre-treatment process, a process of cleaning a support (stage) is exemplified.

Examples of the post-treatment process include a cleaning process, a shape adjusting process of performing deburring or the like, a coloring process, a process of forming a covering layer, and an ultraviolet curable resin curing completion process of performing light irradiation treatment or heat treatment for reliably curing an uncured ultraviolet curable resin.

Further, it has been described in the aforementioned embodiment that the binding solution is applied to all of the layers. However, a layer on which the binding solution is not applied may exist. For example, the binding solution may not be applied to the layer formed immediately on a support (stage), thus allowing this layer to function as a sacrificial layer.

Moreover, in the aforementioned embodiment, the case of performing the binding solution application process using an ink jet method has been mainly described. However, the binding solution application process may be performed using other methods (for example, other printing methods).

Moreover, in the aforementioned embodiment, the case of the binding solution containing a curable resin (polymerizable compound) has been mainly described. However, the binding solution, for example, may contain a thermoplastic resin instead of a curable resin (polymerizable compound). Even in this case, when the thermoplastic resin is changed from a molten state to a solid state or is changed to a solid state by removing the solvent (solvent dissolving the thermoplastic resin) contained in the binding solution, a binding portion can be formed, and thus it possible to obtain the same effect as described above.

Moreover, it has been typically described in the aforementioned embodiment that the finally obtained three-dimensional structure has the binding portion formed using the binding solution. However, in the invention, the finally obtained three-dimensional structure may not contain a binder due to the binding solution, and, for example, may be a sintered body in which the particles are bound together by laminating a plurality of layers and then performing delipidation and sintering.

EXAMPLES

Hereinafter, the invention will be described in more detail with reference to the following specific Examples, but the invention is not limited to these Examples. In the following description, particularly, it is assumed that treatment showing no temperature condition is performed at room temperature (25 degrees Celsius). Further, in the case where a temperature condition is not shown even under various measurement conditions, it is assumed that the measured values are values measured at room temperature (25 degrees Celsius).

1. Preparation of Three-Dimension Formation Composition

Example 1

First, 35 parts by mass of porous silica particles (average particle diameter: 2.6 micrometers, $D_{max}$: 10 micrometers, porosity: 80%, average pore diameter: 60 nm); 2 parts by mass of a reaction product (weight average molecular weight: 50000) of an isobutylene-maleic anhydride copolymer with ammonia, as a binding resin having a chemical structure of an ammonium salt of a carboxyl group; 1 part by mass of polyvinyl alcohol (Saponification degree: 87, polymerization degree: 500), as a binding resin not having a chemical structure of an ammonium salt of a carboxyl group; and 62 parts by mass of water, as a water-based solvent, were mixed, so as to obtain a three-dimension formation composition.

2. Manufacture of Three-Dimensional Structure

Figure 4:
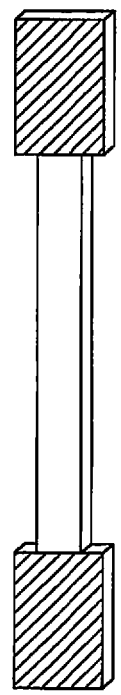
FIG. 4 is a perspective view showing the shape of a three-dimensional structure (three-dimensional structure A) manufactured in each of Examples and Comparative Examples.
Figure 5:
FIG. 5 is a perspective view showing the shape of a three-dimensional structure (three-dimensional structure B) manufactured in each of Examples and Comparative Examples.

The three-dimensional structure A (total length: 200 mm) having a shape shown in FIG. 4, that is, having a dumbbell shape based on JIS K 7139: 1996 (ISO 3167: 1993), and the three-dimensional structure B having a shape shown in FIG. 5, that is, having a cuboid shape of 4 mm (thickness)×10 mm (width)×80 mm (length) were manufactured as follows using the obtained three-dimension formation composition.

First, a layer (thickness: 20 micrometers) was formed on the surface of a support (stage) using the three-dimension formation composition and a squeegee method (layer forming process).

Next, a drying process of heating and drying the formed layer was performed.

In the drying process, each site of the layer was heat-treated under conditions of a heating temperature of 60 degrees Celsius and heating time of 120 seconds. The heat treatment was performed by blowing hot air. The wind speed of hot air in the heat treatment was 7.5 m/s.

Next, a binding solution was applied to the heat-treated layer in a predetermined pattern by an ink jet method (binding solution application process). As the binding solution, a binding solution having the following composition and a viscosity of 18 mPa*s at 25 degrees Celsius was used.

[Polymerizable Compound]
2-(2-vinyloxyethoxy)ethyl acrylate: 32 mass %
phenoxyethyl acrylate: 10 mass %
2-hydroxy-3-phenoxypropyl acrylate: 13.75 mass %
dipropylene glycol diacrylate: 15 mass %
4-hydroxybutyl acrylate: 20 mass %

[Polymerization Initiator]
bis(2,4,6-trimethylbenzoyl)-phenylphosphine oxide: 5 mass %
2,4,6-trimethylbenzoyl-diphenyl-phosphine oxide: 4 mass %

[Fluorescent Whitening Agent (Sensitizer)]
1,4-bis-(benzoxazole-2-yl) naphthalene: 0.25 mass %

Next, the layer was irradiated with ultraviolet rays to cure the binder contained in the layer (curing process).

Thereafter, a series of processes of the layer forming process to the curing process were repeated such that a plurality of layers were laminated while changing the pattern of the applied binding solution depending on the shape of the three-dimensional structure to be manufactured.

Thereafter, the laminate obtained in this way was dipped into ammonia water having a pH of 9 at 40 degrees Celsius for 5 minutes, and ultrasonic vibration was applied thereto to remove an unnecessary portion containing the particles, which are not bound by the binder, in each of the layers. Then, the laminate was washed with water, and was heat-treated under conditions of a heating temperature of 60 degrees Celsius and heating time of 20 minutes. The heat treatment of the laminate was performed by blowing hot air. The wind speed of hot air in the heat treatment was 7.5 m/s.

In this way, the three-dimensional structure A and the three-dimensional structure B were obtained two by two, respectively.

Examples 2 to 8

Three-dimension formation compositions and three-dimensional structures were respectively manufactured in the same manner as in Example 1, except that the configuration of each of the three-dimension formation compositions was changed as shown in Table 1 by changing the kinds of raw materials used in preparing the three-dimension formation composition and the composition ratio of each of the components, and except that the treatment conditions in the drying process and the treatment conditions in the heat treatment at the time of removing the unnecessary portion were changed as shown in Table 1.

Comparative Example 1

A three-dimension formation composition and a three-dimensional structure were manufactured in the same manner as in the above Example, except that, in the preparation of the three-dimension formation composition, a binding resin having a chemical structure of an ammonium salt of a carboxyl group was not used, and the composition ratio of each of the components was changed as shown in Table 1.

Comparative Example 2

A three-dimension formation composition and three-dimensional structure were manufactured in the same manner as in Comparative Example 1, except that, in the removal of the unnecessary portion from the laminate obtained by repeating a series of processes of a layer forming process to a curing process, water was used instead of ammonia water.

The configurations of the three-dimension formation compositions of Examples and Comparative Examples, the treatment conditions in the drying process, and the treatment conditions in the unbound particle removal process are summarized in Table 1. In Table 1, silica is expressed by "$SiO_2$", alumina is expressed by "$Al_2O_3$", calcium carbonate is expressed by "$CaCO_3$", titanium dioxide is expressed by "$TiO_2$", a reaction product of an isobutylene-maleic anhydride copolymer with ammonia is expressed by "IBMA", a reaction product of styrene-maleic anhydride copolymer with ammonia is expressed by "SMA", a polyacrylic acid ammonium salt is expressed by "PAAm", an ammonium salt of carboxymethyl cellulose is expressed by "CMCAm", a polystyrene carboxylic acid ammonium salt is expressed by "PSAc", an ammonium salt of an acrylamide-acrylic acid copolymer is expressed by "AAAAc", an alginic acid ammonium salt is expressed by "AlgAm", polyvinyl alcohol (saponification degree: 87, polymerization degree: 500) is expressed by "PVA", polyacrylamide (weight average molecular weight: 180000) is expressed by "PAA", and polyvinyl pyrrolidone (weight average molecular weight: 50000) is expressed by "PVP".

Further, in Table 1, the binding resin having a chemical structure of an ammonium salt of a carboxyl group is expressed by "predetermined binding resin, and the binding resin not having a chemical structure of an ammonium salt of a carboxyl group is expressed by "other binding resin".

Further, the content ratio of the binding resin having a chemical structure of an ammonium salt of a carboxyl group in the three-dimension formation composition, all in each of Examples, was a value in the range of 1 vol % to 5 vol %, based on the volume of particles. Further, the binding resin contained in the three-dimension formation composition of each of Examples had a solubility of 20 g/100 g water in water at 25 degrees Celsius.

TABLE 1

| | Composition of Three-dimension formation composition | | | | | | |
|---|---|---|---|---|---|---|---|
| | Particle | | Water-based solvent | | Predetermined binding resin | | |
| | Kind | Content ratio (parts by mass) | Kind | Content ratio (parts by mass) | Kind | Weight average molecular weight | Content ratio (parts by mass) |
| Ex. 1 | $SiO_2$ | 35 | Water | 62 | IBMA | 50000 | 2 |
| Ex. 2 | $SiO_2$ | 35 | Water | 62 | SMA | 150000 | 3 |
| Ex. 3 | $SiO_2$ | 35 | Water | 62 | PAAm | 180000 | 3 |
| Ex. 4 | $SiO_2$ | 35 | Water | 60 | AlgAm | 180000 | 5 |
| Ex. 5 | $SiO_2$ | 35 | Water | 62 | PAAm | 150000 | 2 |
| Ex. 6 | $Al_2O_3$ | 80 | Water | 18 | CMCAm | 150000 | 2 |
| Ex. 7 | $CaCO_3$ | 80 | Water | 16 | PSAc | 50000 | 4 |
| Ex. 8 | $TiO_2$ | 80 | Water | 18 | AAAAc | 100000 | 2 |
| Comp. Ex. 1 | $SiO_2$ | 35 | Water | 62 | — | — | — |
| Comp. Ex. 2 | $SiO_2$ | 35 | Water | 62 | — | — | — |

| | Composition of Three-dimension formation composition | | Treatment conditions of unbound particle removal process | | | | |
|---|---|---|---|---|---|---|---|
| | Other binding resins | | Conditions of drying process | | | Heat treatment after removing unbound particles (degrees Celsius) | |
| | Kind | Content ratio (parts by mass) | Heating temperature (degrees Celsius) | Heating time (sec) | pH of ammonia water | Heating temperature (degrees Celsius) | Heating time (min) |
| Ex. 1 | PVA | 1 | 60 | 120 | 9 | 60 | 20 |
| Ex. 2 | — | — | 60 | 120 | 9 | 60 | 20 |
| Ex. 3 | — | — | 60 | 120 | 9 | 60 | 20 |
| Ex. 4 | — | — | 60 | 120 | 9 | 60 | 20 |
| Ex. 5 | PAA | 1 | 60 | 120 | 9 | 60 | 20 |
| Ex. 6 | — | — | 60 | 120 | 9 | 60 | 20 |
| Ex. 7 | — | — | 60 | 120 | 9 | 60 | 20 |
| Ex. 8 | — | — | 60 | 120 | 9 | 60 | 20 |

TABLE 1-continued

|  |  |  |  |  |  |  |  |
|---|---|---|---|---|---|---|---|
| Comp. Ex. 1 | PVP | 3 | 60 | 120 | 9 | 60 | 20 |
| Comp. Ex. 2 | PVP | 3 | 60 | 120 | — | 60 | 20 |

3. Evaluation (3.1. Dimensional Accuracy)

The thickness, width, and length of the three-dimensional structure B of each of Examples and Comparative Examples were measured, the deviation amounts from designed values were determined, and then the dimensional accuracy thereof was evaluated according to the following criteria.

A: deviation amount from designed value in thickness, width, and length is less than 1.0% with respect to the maximum deviation amount.

B: deviation amount from designed value in thickness, width, and length is 1.0% to less than 2.0% with respect to the maximum deviation amount.

C: deviation amount from designed value in thickness, width, and length is 2.0% to less than 4.0% with respect to the maximum deviation amount.

D: deviation amount from designed value in thickness, width, and length is 4.0% to less than 7.0% with respect to the maximum deviation amount.

E: deviation amount from designed value in thickness, width, and length is 7.0% or more with respect to the maximum deviation amount.

(3.2. Tensile Strength and Tensile Elastic Modulus)

The tensile strength and tensile elastic modulus of the three-dimensional structure A of each of Examples and Comparative Examples were measured under the conditions of a tensile yield stress of 50 mm/min and a tensile elastic modulus of 1 mm/min based on JIS K 7161: 1994 (ISO 527: 1993). The tensile strength and tensile elastic modulus thereof were evaluated according to the following criteria.

[Tensile Strength]
  A: tensile strength of 38 MPa or more
  B: tensile strength of 33 MPa to less than 38 MPa
  C: tensile strength of 23 MPa to less than 33 MPa
  D: tensile strength of 13 MPa to less than 23 MPa
  E: tensile strength of less than 13 MPa

[Tensile Elastic Modulus]
  A: tensile elastic modulus of 1.6 GPa or more
  B: tensile elastic modulus of 1.4 GPa to less than 1.6 GPa
  C: tensile elastic modulus of 1.2 GPa to less than 1.4 GPa
  D: tensile elastic modulus of 1.0 GPa to less than 1.2 GPa
  E: tensile elastic modulus of less than 1.0 GPa (3.3. Bending Strength and Bending Elastic Modulus)

The bending strength and bending elastic modulus of the three-dimensional structure B of each of Examples and Comparative Examples were measured under the conditions of a distance between supporting points of 64 mm and a testing speed of 2 mm/min based on JIS K 7171: 1994 (ISO 178: 1993). The bending strength and bending elastic modulus thereof were evaluated according to the following criteria.

[Bending Strength]
  A: bending strength of 68 MPa or more
  B: bending strength of 63 MPa to less than 68 MPa
  C: bending strength of 48 MPa to less than 63 MPa
  D: bending strength of 33 MPa to less than 48 MPa
  E: bending strength of less than 33 MPa

[Bending Elastic Modulus]
  A: bending elastic modulus of 2.5 GPa or more
  B: bending elastic modulus of 2.4 GPa to less than 2.5 GPa
  C: bending elastic modulus of 2.3 GPa to less than 2.4 GPa
  D: bending elastic modulus of 2.2 GPa to less than 2.3 GPa
  E: bending elastic modulus of less than 2.2 GPa (3.4. Water Resistance)

In the three-dimensional structure B of each of Examples and Comparative Examples, the mass $W_1(g)$ immediately after the manufacture thereof was measured, and then the three-dimensional structure B was dipped into water and left for 24 hours. Thereafter, the three-dimensional structure B was taken out from water, the water adhered thereto was sufficiently removed, and then the mass $W_2(g)$ of the three-dimensional structure B was measured.

The mass increase rate ($[(W_2-W_1)/W_1] \times 100$) of the three-dimensional structure B was determined from $W_1$ and $W_2$ values, and the water resistance thereof was evaluated according to the following criteria. It can be inferred that the smaller the mass increase rate, the more excellent the water resistance.

A: mass increase rate of less than 5%
  B: mass increase rate of 5% to less than 10%
  C: mass increase rate of 10% to less than 20%
  D: mass increase rate of 20% to less than 30%
  E: mass increase rate of 30% or more These results are summarized in Table 2.

TABLE 2

|  | Dimensional accuracy | Tensile strength | Tensile elastic modulus | Bending strength | Bending elastic modulus | Water resistance |
|---|---|---|---|---|---|---|
| Ex. 1 | A | A | A | A | A | A |
| Ex. 2 | A | A | A | A | A | A |
| Ex. 3 | B | A | A | A | A | B |
| Ex. 4 | B | A | A | A | A | B |
| Ex. 5 | A | A | A | A | A | A |
| Ex. 6 | B | A | A | A | A | B |
| Ex. 7 | B | A | A | A | A | B |
| Ex. 8 | A | A | A | A | A | A |
| Comp. Ex. 1 | E | E | E | E | E | E |
| Comp. Ex. 2 | E | E | E | E | E | E |

As apparent from Table 2, in the invention, three-dimensional structures having excellent dimensional accuracy and excellent mechanical strength could be obtained. Further, in the invention, three-dimensional structures having excellent water resistance could be obtained. In contrast, in Comparative Examples, satisfactory results could not be obtained.

REFERENCE SIGNS LIST

1: layer
2: binding solution
3: cured portion
100: three-dimensional structure
9: support (stage)

The invention claimed is:

1. A three-dimension formation composition, comprising:
    particles;
    a binding resin; and
    a water-based solvent,
    wherein the binding resin has an ammonium salt of a carboxyl group as a functional group, and
    the weight average molecular weight of the binding resin is 50000 to 200000.

2. The three-dimension formation composition according to claim 1,
    wherein the binding resin contains one or two or more selected from the group consisting of a reaction product of an olefin-maleic anhydride copolymer with ammonia, a polyacrylic acid ammonium salt, an ammonium salt of carboxymethyl cellulose, a polystyrene carboxylic acid ammonium salt, an ammonium salt of an acrylamide-acrylic acid copolymer, and an alginic acid ammonium salt.

3. The three-dimension formation composition according to claim 1,
    wherein the binding resin has a structure of acid anhydride which is formed by heating.

4. The three-dimension formation composition according to claim 1,
    wherein the binding resin has a cyclic chemical structure which is formed by heating.

5. The three-dimension formation composition according to claim 4,
    wherein the binding resin has a five-membered or six-membered cyclic structure which is formed by heating.

6. The three-dimension formation composition according to claim 1,
    wherein the binding resin has an amide group (—$CONH_2$) together with the ammonium salt of a carboxyl group in a molecule.

7. The three-dimension formation composition according to claim 1, further comprising:
    a compound having an amide group (—$CONH_2$) in addition to the binding resin.

8. The three-dimension formation composition according to claim 7,
    wherein the compound having an amide group is polyacrylamide.

9. A method of manufacturing a three-dimensional structure, in which the three-dimensional structure is manufactured by laminating a layer, the method comprising:
    forming the layer using a three-dimension formation composition containing particles, a binding resin, and a water-based solvent;
    removing the water-based solvent from the layer by heating the layer; and
    applying a binding solution containing a binder to the layer,
    wherein the binding resin has an ammonium salt of a carboxyl group as a functional group.

10. The method of manufacturing a three-dimensional structure according to claim 9,
    wherein, in the removing of the water-based solvent, the layer is heated to a temperature equal to or higher than the glass transition temperature of the binding resin.

11. The method of manufacturing a three-dimensional structure according to claim 9,
    wherein, in the removing of the water-based solvent, the heating temperature is 30 degrees Celsius to 140 degrees Celsius.

12. The method of manufacturing a three-dimensional structure according to claim 9, further comprising:
    removing the particles, which are not bound by the binder, after repeating the forming of the layer, the removing of the water-based solvent, and the applying of the binding solution,
    wherein the pH of a removing solution used in the removing of the unbound particles is 9 or more.

13. The method of manufacturing a three-dimensional structure according to claim 9, further comprising:
    removing the particles, which are not bound by the binder, after repeating the forming of the layer, the removing of the water-based solvent, and the applying of the binding solution,
    wherein, in the removing of the unbound particles, ammonia is used.

14. A three-dimensional structure, which is manufactured by the method of manufacturing a three-dimensional structure according to claim 9.

* * * * *